(No Model.)
G. M. MOWBRAY.
PROCESS OF AND APPARATUS FOR WASHING, DECOLORING, AND DRAINING PYROXYLINE.
No. 349,658. Patented Sept. 21, 1886.
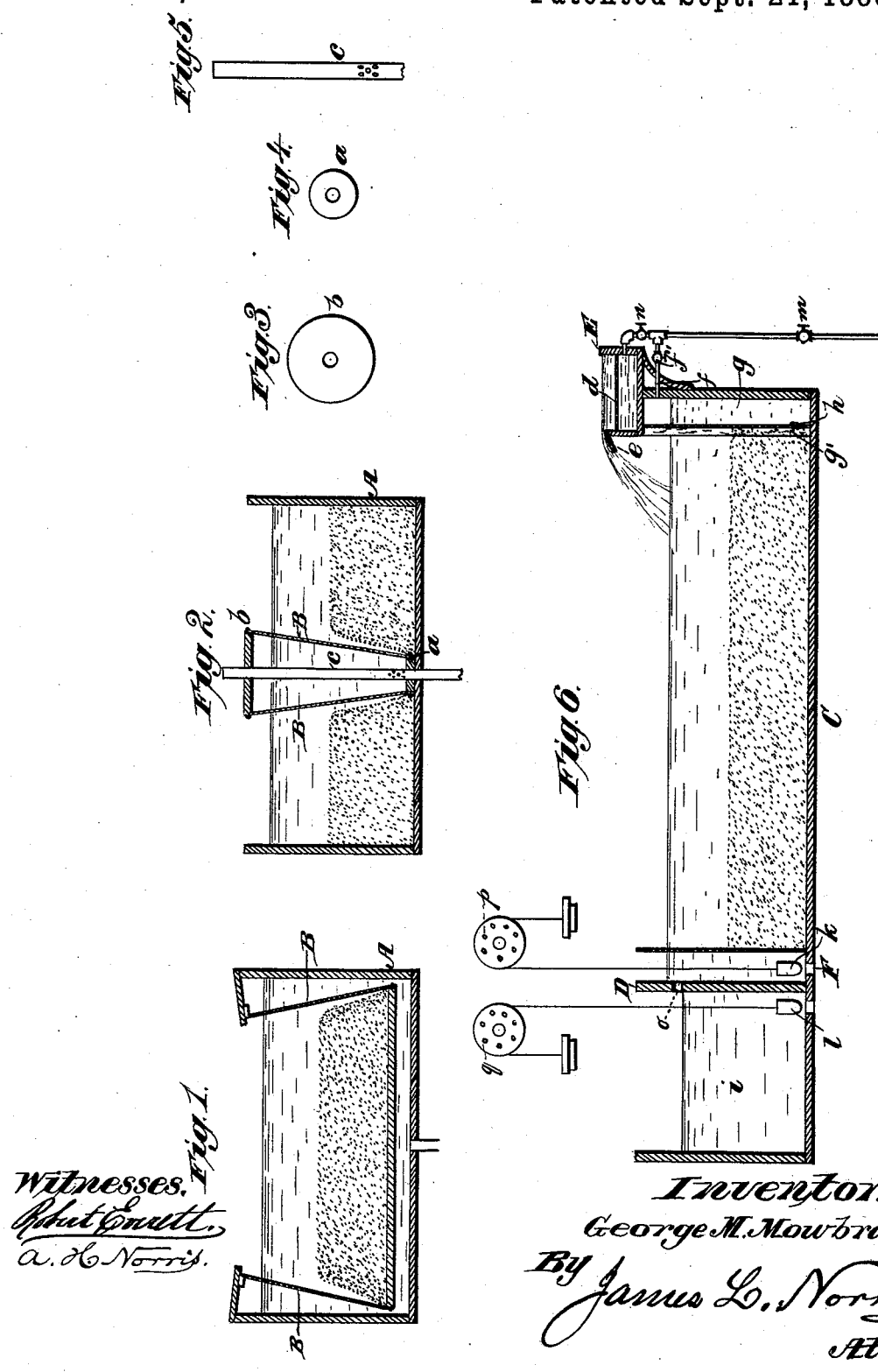

UNITED STATES PATENT OFFICE.

GEORGE M. MOWBRAY, OF NORTH ADAMS, MASSACHUSETTS, ASSIGNOR TO THE AMERICAN ZYLONITE COMPANY, OF NEW YORK, N. Y.

PROCESS OF AND APPARATUS FOR WASHING, DECOLORING, AND DRAINING PYROXYLINE.

SPECIFICATION forming part of Letters Patent No. 349,658, dated September 21, 1886.

Application filed January 27, 1886. Serial No. 189,967. (No model.)

*To all whom it may concern:*

Be it known that I, GEORGE M. MOWBRAY, a citizen of the United States, residing at North Adams, in the county of Berkshire and State of Massachusetts, have invented new and useful Improvements in Processes and Apparatus for Washing, Decoloring, and Draining Pyroxyline, of which the following is a specification.

My invention relates to the purification of pyroxyline, and comprehends the relative inflow of a supply of pure water and an outflow of the impure washing-water from the unground and recently-converted pyroxyline; the application of certain chemicals to remove stain or color, and of such a disposition of the filtering medium of a drainage-vat as prevents the tendency of ground pyroxyline as it mats or felts during drainage from clogging the filtering medium, and thereby interfering with the free escape of the washing-water.

The invention will be fully hereinafter described and claimed, reference being made to the accompanying drawings, illustrating an apparatus for carrying my invention into effect, in which—

Figure 1 is a cross-sectional view of a drainage-tank having an overhanging filtering medium; Fig. 2, a similar view showing a modification of the drainage-tank and filtering medium; Figs. 3, 4, and 5, detail views of the disks and perforated tube shown in Fig. 2; and Fig. 6 is a longitudinal sectional view of the washing-tank.

In the manufacture of plastic compounds having soluble pyroxyline for their base, notwithstanding the operator may have taken the precaution to select the finest bleached tissue-paper or bleached cotton fiber, after converting the cellulose into nitro-cellulose, as the latter dries it becomes slightly tinted or colored. This I have found by analysis consists of ferric oxide mordanted on the nitro-cellulose. Long-continued washing does not remove this tint, and should there be iron in the water excessive washing is apt to increase it. Bleaching with sulphuric acid does not altogether remove it. Salt and sulphuric acid have been tried; but as salt usually contains traces of iron this method is very apt to increase the tint. Since the aniline dye-stuffs are extensively used to color various plastic compounds of this class, it is very desirable, in order to obtain bright material, that this ferric stain should be removed. By the method and chemicals hereinafter set forth decoloration takes place in a few minutes, especially if applied immediately before the completion of grinding the nitro-cellulose into pulp, and it is also very effective, but with less rapidity, in decolorizing the nitro-cellulose immediately after conversion before grinding. As, however, the grinding process and the water used to rinse the nitro-cellulose introduce iron, which mordants on the product, it is more effective to apply the decolorant toward the termination of the work of the "hollander," rather than before the fibers of the nitro-cellulose are disintegrated.

To enable others skilled in the art to avail themselves of my invention, I proceed to describe the same, first specifying the decolorant and its application and the arrangements for draining the recently-ground nitro-cellulose, and finally the system of inflow and outflow of water used in washing the unground nitro-cellulose immediately after immersion, and before grinding into pulp.

I take of oxalic acid twenty-five pounds, hydrochloric acid fifteen pounds, fresh spring-water one hundred gallons. I prefer, first, dissolving the oxalic acid in the water, and then adding the hydrochloric acid to the clear solution.

About three gallons of the above solution usually suffices for five hundred pounds of pulp, and is most effective if added just before pumping the pultaceous mixture out of the hollander. The grooved grinding-cylinder should be raised from the fixed ribbed bed. Stir the pulp thoroughly, and keep the pulp moving actively for ten or fifteen minutes, when it will be decolorized. Lower the revolving strainer, turn on a full stream of water, as free from iron as is procurable, for about fifteen minutes, or until the pulp no longer reddens when tested with a few drops of litmus solution. As soon as this reddening action ceases I immediately pump the pulp into the drainage-tank A, arranged as hereinafter described, and allow water to drain away, and then transfer to a centrifugal machine. The pulp-grinding cylinder of the hollander and its fixed ribbed bed should be of gun-metal, and all conduits, pails, and stirring-paddles should be carefully guarded, so that no iron, metal, or rust is present to color the product. This hollander may be lined with zinc to advantage; but the zinc surface should be carefully cleansed after each grind, to remove a smeary ferrous oxide that deposits thereon by galvanic action, and which otherwise, passing to the state of ferric oxide, would stain the pulp.

Figure 1 shows a section of a drainage-tank, A, which is so constructed with the filtering medium B overhanging toward the center at an angle of about twelve degrees, or eight inches, from the perpendicular in a height of four feet. Fig. 2 is a modification in which the filtering medium B is nailed with copper or brass tacks to two disks, $a$ $b$, held apart by a piece of two-inch copper or brass tubing, $c$, which is at the lower portion provided with perforations of about three-eighths of an inch in diameter. These conical drainage devices are set in the tank A, the copper or brass tube $c$ being prolonged at the lower end, so as to pass through the floor of the tank to carry off the washing-water of the ground pulp.

The overhanging of Fig. 1 and the inverted-cone strainer, Fig. 2, are constructed to overcome a property of this pulp, which clogs the pores of any flat filtering medium, by reason of its tendency to felt together if left "en masse," whereas when placed in a tank, as shown, this tendency of the pulp to felt or aggregate draws it from the filter and leaves a space for the water to pass off freely.

Fig. 3 is the larger, and Fig. 4 the less, of the two disks $a$ $b$, and Fig. 5 shows the copper tubing perforated at the lower part, serving to hold the disks in position and carry off the drainage-water.

Fig. 6 is a sectional view of a washing-tank to illustrate a systematic method of washing out the acid from newly-converted nitro-cellulose. It consists of an open tank, C, about sixteen feet in lenth, eight feet in width, and four feet deep, with a partition, D, about four feet from what I term the "rear" end, which should be adjoining the dumping-trough to facilitate transfer of nitro-cellulose therefrom. Mounted on the tank at the front end is a water-receiving strainer and distributing box or trough, E, about twelve inches deep and twenty-four inches wide, divided about midway horizontally throughout by a filtering or straining medium, $d$, to keep back any sand, grit, or chips. The side of this box which faces to the rear of the tank and its contents is fitted with a zinc apron, $e$, about three inches lower than the ends and hinder side, which serves to distribute by overflow in a sheet-like stream the clean pure washing-water over the underlying lightly-packed pyroxyline. This service-water enters beneath the filtering medium, passes up through the same, and then overflows onto and is distributed by the zinc apron onto the tank full of pyroxline. Another water-service, $f$, enters through the front end of the tank into a pocket, $g$, formed between the end of the tank and a series of supporting-ribs, $g'$, of pine wood or birch wood, preferably supporting a filtering and distributing screen, $h$, to keep back sand, &c. We thus have a thorough permeating flow of water through the pyroxyline on the surface from the zinc apron, and through the lightly-packed mass from the lower supply, which passes through the filtering medium stretched athwart the whole area of the end of the tank. These two services of water, after having performed their duty of removing all traces of acid from the pyroxyline, drain off through the outlet F.

The operation of systematic washing is thus performed: As batch after batch of nitro-cellulose is dumped into the washing-trough from the centrifugal machine, it is transferred into the space $i$, partitioned off at the rear end of the tank, where the adherent pasty ferric sulphate dissolves, tinting the water greenish; thence it is transferred into the washing-tank proper, and is moved up toward the end of the tank, where the water enters, and contrariwise to the current, which is from the front to the rear, while the pyroxyline is moved from the rear toward the front. During the day this action has very thoroughly washed all acid from about one-half of the pyroxyline, and during the night, the flow continuing and no fresh-made poroxyline being transferred, the pyroxyline has been as thoroughly washed as water can wash it. If it is required to be decolorized without grinding, about three gallons of the decoloring-liquid hereinbefore described should be entered at the termination of the day's work, shutting off the washing-water for an hour and closing two-thirds of the outlet, sprinkling it over two-thirds of the lightly-packed pyroxyline at the upper or front end, and allowing about an hour's time for it to diffuse itself throughout the pyroxyline. Then let on the washing-water and open the overflow-plug $k$, to let out as much as flows in and no more, and in a few hours the acid will be thoroughly removed and the pyroxyline free from stain and of a snowy whiteness. It is now ready for the hollander to be ground and again decolorized, if desirable, then drained, rinsed in the centrifugal machine, the matted mass broken up fine and dried. It is now ready to be mixed with the ingredients requisite to form it into a plastic compound.

The inflow of washing-water is controlled by the stop-cocks $m$, $n$, and $f'$, Fig. 6, while overflow of water from main washing-tank into dumping-division of tank $i$ is regulated at the overflow exit or exits $o$, and also by the several outflows $k$ and $l$, controlled by balance-weights and stop-plugs $p$ and $q$, which retain the stop-ways $k$ and $l$ at any desired position. These enable the operator to set the several inlets and outlets so that the water during day and night automatically washes, without unnecessary waste, the pyroxyline in the main tank.

The essential improvement lies in so directing the current of water that the pure water shall pass on steadily through the pyroxyline, and thence on to the overflow into the partitioned portion of tank $i$, and escape in part through outlet $k$, and the residue, after serving to receive the sour acid pyroxyline, leaves through overflow $l$.

Having thus described my invention, what I claim is—

1. The process of decolorizing pyroxyline by subjecting it to the action of oxalic acid and hydrochloric acid, substantially as described.

2. The process of decolorizing pyroxyline by subjecting it to the action of oxalic acid, or a soluble acid oxalate, substantially as described.

3. The method herein described of purifying pyroxyline, which consists in decolorizing the same, subjecting it to a washing step, placing it in a drainage-tank and draining off the water, substantially as described.

4. The method herein described of washing out the acid from newly-converted pyroxyline, which consists in placing the same in a tank, flowing water through the mass from one side or end of the tank, and filtering or straining the overflowing water at another side or end of the tank, substantially as described.

5. The apparatus, consisting of a distributing water-trough and a filtering or straining medium, for washing pyroxyline, substantially as described.

6. The combination, with a drainage-tank, of an overhanging filtering medium, so that the felting tendency of pyroxyline pulp shall not impede the draining-liquid as it leaves the pyroxyline, substantially as described.

7. The combination of a washing-tank, means of controlling the inflow of washing-water, as at $m$, $n$, and $f$, with the overflow $o$, outflows $k$ and $l$, and means of controlling at $p$ and $q$, substantially as shown and described.

In testimony whereof I affix my signature in presence of two witnesses.

GEO. M. MOWBRAY.

Witnesses:
HARRY S. MOWBRAY,
MERRITT T. WHITE.